US012001821B2

United States Patent
Ni et al.

(10) Patent No.: US 12,001,821 B2
(45) Date of Patent: *Jun. 4, 2024

(54) GENERATION AND/OR RECOMMENDATION OF TOOLS FOR AUTOMATING ASPECTS OF COMPUTER PROGRAMMING

(71) Applicant: GOOGLE LLC, Mountain View, CA (US)

(72) Inventors: Bin Ni, Fremont, CA (US); Owen Lewis, Stanford, CA (US); Qianyu Zhang, Sunnyvale, CA (US)

(73) Assignee: GOOGLE LLC

( * ) Notice: Subject to any disclaimer, the term of this patent is extended or adjusted under 35 U.S.C. 154(b) by 0 days.

This patent is subject to a terminal disclaimer.

(21) Appl. No.: 18/119,640

(22) Filed: Mar. 9, 2023

(65) Prior Publication Data
US 2023/0214195 A1 Jul. 6, 2023

Related U.S. Application Data

(63) Continuation of application No. 17/123,768, filed on Dec. 16, 2020, now Pat. No. 11,604,628.

(51) Int. Cl.
*G06F 8/40* (2018.01)
*G06N 20/00* (2019.01)

(52) U.S. Cl.
CPC .............. *G06F 8/40* (2013.01); *G06N 20/00* (2019.01)

(58) Field of Classification Search
CPC .................................. G06F 8/40; G06N 20/00
See application file for complete search history.

(56) References Cited

U.S. PATENT DOCUMENTS

| 10,817,264 | B1 | 10/2020 | Goodsitt et al. |
| 2018/0225281 | A1 | 8/2018 | Song et al. |
| 2019/0050319 | A1 | 2/2019 | Gondalia et al. |
| 2019/0272171 | A1 | 9/2019 | Chen et al. |

(Continued)

OTHER PUBLICATIONS

European Patent Office; International Search Report and Written Opinion of Application No. PCT/US2021/063575; 16 pages; dated Mar. 21, 2022.

(Continued)

*Primary Examiner* — Wei Y Zhen
*Assistant Examiner* — Amir Soltanzadeh
(74) *Attorney, Agent, or Firm* — Gray Ice Higdon

(57) ABSTRACT

Implementations are described herein for leveraging prior source code transformations to facilitate automatic creation and/or recommendation of tools for automating aspects of source code transformations captured in real time. In various implementations, a transformation made by a programmer to a source code snipped may be captured in a source code editor application in real time. Based on the transformation and the intent, one or more candidate source code transformations may be identified from one or more repositories of prior source code transformations made by one or more other programmers. The source code editor application may be caused to provide output indicative of a tool that is operable to automate one or more edits associated with both the transformation made by the programmer to the source code snippet and with one or more of the candidate source code transformations.

20 Claims, 6 Drawing Sheets

(56) References Cited

U.S. PATENT DOCUMENTS

| | | | |
|---|---|---|---|
| 2020/0097261 | A1 | 3/2020 | Smith et al. |
| 2020/0097845 | A1* | 3/2020 | Shaikh ............... G06Q 30/0201 |
| 2020/0104102 | A1 | 4/2020 | Brockschmidt et al. |
| 2020/0167134 | A1 | 5/2020 | Dey et al. |
| 2020/0371778 | A1 | 11/2020 | Ni et al. |
| 2021/0141640 | A1 | 5/2021 | Turner et al. |
| 2021/0142185 | A1* | 5/2021 | Baek ...................... G06Q 10/10 |
| 2021/0157553 | A1 | 5/2021 | Ligman et al. |
| 2021/0279042 | A1 | 9/2021 | Allamanis et al. |
| 2021/0303447 | A1 | 9/2021 | Haze et al. |
| 2022/0188081 | A1 | 6/2022 | Ni et al. |

OTHER PUBLICATIONS

Gao, Xiang, et al. "Feedback-Driven Semi-Supervised Synthesis of Program Transformations." Proceedings of the ACM on Programming Languages 4.OOPSLA (2020): 1-30.

Miltner, Anders, et al. "On the Fly Synthesis of Edit Suggestions." Proceedings of the ACM on Programming Languages 3.OOPSLA (2019): 1-29.

Allamanis et al., "Learning to Represent Programs with Graphs" ICLR 2018. 17 p. 2018.

Ball et al., "If Your Version Control System Could Talk . . . " 5 pages. 1997.

Cubranic et al., "Hipikat: Recommending Pertinent Software Development Artifacts" Research Gate. Proceedings—International Conference on Software Engineering. Jan. 2003. 12 pages. Jan. 2003.

Gall et al., "Detection of Logical Coupling Based on Product Release History" International Conference on Software Maintenance. 1998. 10 pages. 1998.

Nguyen et al., "Using Topic Model to Suggest Fine-grained Source Code Changes" 2016 IEEE International Conference on Software Maintenance and Evolution. 11 pages. 2016.

Yin et al., "Learning to Represent Edits" arXiv:1810.13337v2 [cs.LG] dated Feb. 22, 2019, 22 pages. Feb. 22, 2022.

Zimmermann; et al., "Mining Version Histories to Guide Software Changes" Saarland University. 10 pages; dated 2005.

* cited by examiner

Fig. 4

```
SOURCE CODE EDITOR APPLICATION                          230 void* fakeFunction(void* arg)
{                                               232 unsigned long i = 0;
    counter += 1;
    printf("\n Job %d has started\n", counter);

for (i = 0; i < (0xFFFFFFFF); i++)
        ;

printf("\n Job %d has finished\n", counter);

return NULL;
}
```

APPLICABLE MACRO TOOLS

THE FOLLOWING TOOLS MAY BE APPLICABLE TO THE SELECTED SOURCE CODE:

-INSERT MUTEX LOCK
-CHANGE HEX TO DECIMAL
-CHANGE PRINTF TO COUT

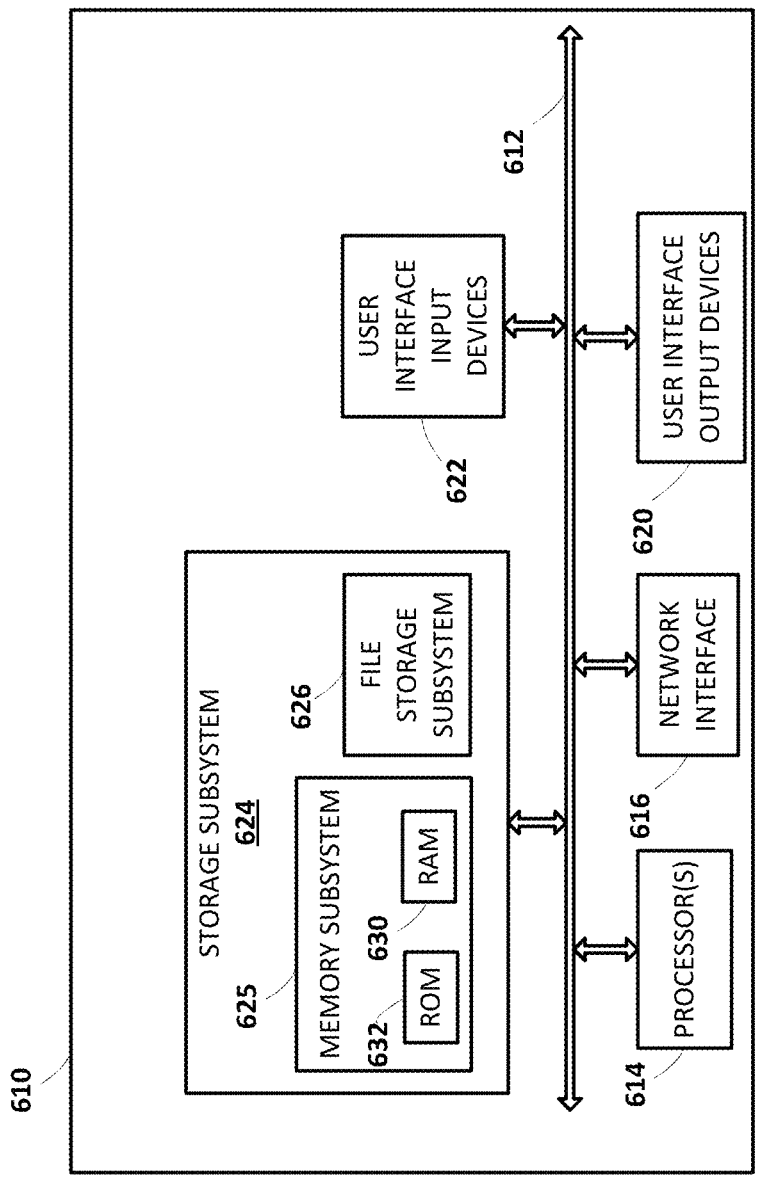

GENERATION AND/OR RECOMMENDATION OF TOOLS FOR AUTOMATING ASPECTS OF COMPUTER PROGRAMMING

BACKGROUND

Programmers tend to perform the same or similar actions repeatedly when writing or editing source code. For example, as part of a migration of a source code base, a programmer may change the name of a variable and/or function many times across many different source code files. As another example, as part of a security upgrade, a programmer may wrap particular types of statements in lock or mutual exclusion (mutex) calls across a code base. Tools such as macros can be created to automate repetitive tasks such as these. However, creating these tools can be cumbersome and/or require considerable expertise/resources. Moreover, many such tools may not scale outside of a particular context.

SUMMARY

Implementations are described herein for leveraging prior source code transformations to facilitate automatic creation and/or recommendation of tools for automating aspects of source code transformations captured in real time. In various implementations, a source code transformation made by a programmer using a source code editor application (e.g., which may be part of an integrated development environment, or "IDE") may be captured, e.g., as a sequence of edits, a bag of edits, a change graph, etc. This source code transformation, an intent behind it (e.g., wrapping statements in mutexes), and/or a context in which the source code transformation is being made may be determined (e.g., migration of a code base that operates an interactive website).

These data points may then be used to identify, from one or more repositories of prior source code transformations made by one or more other programmers, one or more candidate source code transformations that are similar to the present transformation in various aspects. If these candidate transformation(s) satisfy various criteria, such as frequency of use, similarity to the transformation-at-issue, etc., then a tool (e.g., a macro) that is operable to automate one or more edits associated with both the present source code transformation and the candidate prior source code transformation(s) may be generated and/or presented/recommended to the programmer. The programmer may operate this tool to, for instance, jump to other similar source code snippets that are likely subject to the same/similar transformation, and recommend the same edits (or simply make them automatically).

An intent behind a source code transformation may be determined in various ways. In some implementations, the intent may be determined by performing semantic processing on a natural language comment present in proximity to the source code snippet that underwent the transformation, or a natural language submitted as part of a "commit" to a version control system (VCS). Alternatively, one or more tokens (e.g., variable names, function names) of the source code snippet that was/is being transformed may be semantically processed. Alternatively, in some implementations, a reduced dimensionality representation (e.g., embedding, vector) of the source code snippet may be generated, e.g., using a machine learning model such as a feed-forward neural network, a graph neural network, etc. This embedding may then be used to identify other embeddings associated with other similar source code transformations (e.g., that are proximate in latent space). In some such implementations, those other embeddings may be indexed by intents, such that an intent of a similar (e.g., in close proximity) embedding can be imputed to the transformation in question.

The context in which a captured source code transformation was made can be determined in various ways as well. In some implementations, the context may include a function, goal, task, or domain of an executable application that results from compilation of a source code snippet the programmer is working on. Such a context may be determined, for instance, based on documentation related to the source code (whether integral as inline comments or as a separate README file or similar).

In some implementations, the context in which a programmer makes a transformation to a source code snippet may be determined based on one or more other transformations made by the programmer to other source code snippets prior to the transformation. If the programmer has made other transformations to other snippets of source code to adapt them to a new application programming interface (API), then the context may be a transition of the whole code base to the new API. Prior source code transformations that were made in similar contexts (e.g., to adapt to the same new API, or to adapt to a similar API) may be identified and used to generate a tool for automating aspect(s) of the current transformation. Notably, in a situation like this, the context in which the transformation is being made (transitioning a code base between APIs) may be similar to, if somewhat broader than, the intent behind the individual transformation (changing a function call from one API to another).

Once the context in which a source code transformation is being made is determined, it can be used in some implementations to, for instance, select one or more distinct source code repositories of prior source code transformations to search for relevant prior source code transformations, and/or to rank a plurality of candidate prior source code transformations. Suppose the programmer is updating source code that controls an interactive website. In such a case, one or more repositories of source code associated with generation of dynamic/interactive web documents may be searched for similar transformations. Additionally or alternatively, in some implementations, candidate transformations may be obtained agnostically from multiple different repositories, and these candidate source code transformations may be ranked based on their contextual similarity to the present context in which the programmer made the present source code transformation. In other implementations, data indicative of intent and/or context, as well as data indicative of transformation, may be applied as inputs across one or more machine learning models.

Techniques described herein give rise to various technical advantages. By searching other source code repositories for transformations that are not only similar syntactically to the present source code transformation under consideration, but also similar contextually and/or semantically, it is possible to leverage large amounts of prior knowledge and expertise to facilitate automated generation and/or recommendation of robust new tools for automating repetitive programming tasks, even with a relatively small number (e.g., few shots) of captured transformations made by the programmer.

Additionally, in some implementations, the repositories of prior source code transformations may be continuously monitored, such that recent transformations made to otherwise unrelated code base(s) may be leveraged in close to real time. For example, a source code base that generates dynamic markup language documents for use as interactive web pages may be periodically and/or continuously evaluated, e.g., on the basis of how well those dynamic web pages perform various functions (e.g., with minimal latency, without risking privacy, etc.). A transformation made to a source code snippet of that source code base that improved performance of a resulting web page may be a good candidate for consideration for generation of a tool to automate aspect(s) of that transformation. Thus, if the current programmer makes one or more transformations that are similar to prior successful transformations, a tool may be generated/recommended that automates edits from the current and prior transformations.

In addition to providing tools such as macros for automating repetitive tasks, in various implementations, prior source code transformations made elsewhere may be leveraged to aid the current programmer in writing better code. In some implementations, if the current programmer makes a transformation that (i) diverges too much from successful transformation(s) made elsewhere in similar contexts/for similar intents, or (ii) approaches too closely to prior transformation(s) known to be unsuccessful, the programmer may receive a notification (e.g., visual annotation of the code, pop-up window, etc.) to that effect, e.g., as the programmer works in the source code editing application (e.g., an IDE). The notification may also inform the programmer of how to make the current transformation more similar to a previous, successful transformation made elsewhere, or how to avoid issues created by a previous unsuccessful transformation made elsewhere.

In some implementations, a method implemented using one or more processors may include: capturing, in a source code editor application in real time, a transformation made by a programmer to a source code snippet; determining an intent behind the transformation; based on the transformation and the intent, identifying, from one or more repositories of prior source code transformations made by one or more other programmers, one or more candidate source code transformations; and causing the source code editor application to provide output indicative of a tool that is operable to automate one or more edits associated with both the transformation made by the programmer to the source code snippet and with one or more of the candidate source code transformations.

In various implementations, the identifying may include applying data indicative of the transformation as input across a machine learning model to generate output, wherein the one or more candidate source code transformations are identified from one or more of the repositories of prior source code transformations based on the output. In various implementations, the output generated based on the machine learning model may include an embedding, and identifying the one or more candidate source code transformations comprises identifying one or more nearest neighbors to the embedding in an embedding space indexed by embeddings of prior source code transformations of one or more of the repositories of prior source code transformations.

In various implementations, determining the intent behind the transformation may include semantically processing a natural language comment contained in a source code file that also includes the source code snippet. In various implementations, determining the intent behind the transformation may include semantically processing one or more tokens of the source code snippet.

In various implementations, the method may include: determining a context in which the transformation is being made; and selecting one or more of the repositories of prior source code transformations based on the context. In various implementations, the context may include a function of an executable application that results from compilation of the source code snippet. In various implementations, the context may be determined based on one or more other transformations made by the programmer to other source code snippets prior to the transformation.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4 depicts another example GUI that may be presented in accordance with various implementations described herein.

FIG. 6 illustrates an example architecture of a computing device.

DETAILED DESCRIPTION

Figure 1:
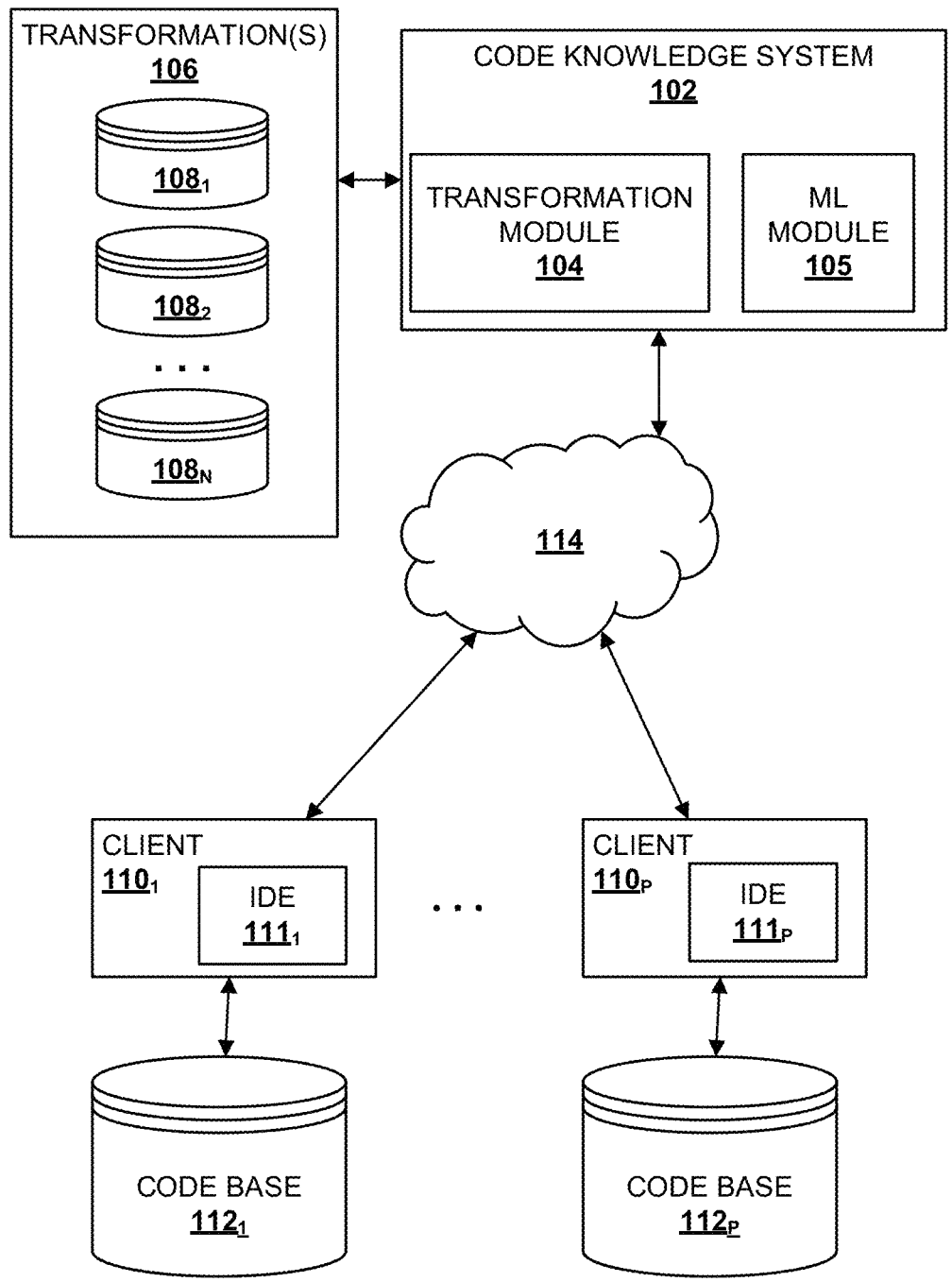
FIG. 1 schematically depicts an example environment in which selected aspects of the present disclosure may be implemented, in accordance with various implementations.

FIG. 1 schematically depicts an example environment in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs") that execute computer-readable instructions stored in memory, or other types of logic such as application-specific integrated circuits ("ASIC"), field-programmable gate arrays ("FPGA"), and so forth. Some of the systems depicted in FIG. 1, such as a code knowledge system 102, may be implemented using one or more server computing devices that form what is sometimes referred to as a "cloud infrastructure," although this is not required.

A code knowledge system 102 may be provided for helping clients $110_{1-p}$ manage their respective code bases $112_{1-p}$. Code knowledge system 102 may include, among other things, a transformation module 104 that is configured to perform selected aspects of the present disclosure in order to help one or more clients $110_{1-p}$ to manage and/or make changes to one or more corresponding code bases $112_{1-p}$.

Each client 110 may be, for example, an entity or organization such as a business (e.g., financial institute, bank, etc.), non-profit, club, university, government agency, or any other organization that operates one or more software systems. For example, a bank may operate one or more software systems to manage the money under its control, including tracking deposits and withdrawals, tracking loans, tracking investments, and so forth. An airline may operate one or more software systems for booking/canceling/rebooking flight reservations, managing delays or cancelations of flight, managing people associated with flights, such as passengers, air crews, and ground crews, managing airport gates, and so forth.

Transformation module 104 may be configured to leverage prior source code transformations to facilitate automatic creation and/or recommendation of tools for automating aspects of source code transformations captured in real time in order to aid clients $110_{1-p}$ in editing, updating, replatforming, migrating, or otherwise acting upon their code bases $112_{1-p}$. For example, transformation module 104 may be configured to determine an intent behind a transformation made by a programmer to a source code snippet. This transformation made by the programmer may be captured in real time (e.g., as the edit is being made, or immediately after) from a source code editor application being operated by the programmer.

Based on the transformation and the intent, transformation module 104 may identify, from one or more repositories $108_1$-$108_N$ of prior source code transformations 106 made by one or more other programmers, one or more candidate source code transformations. Transformation module 104 may then cause the source code editor application to provide output indicative of a tool that is operable to automate one or more edits associated with both the transformation made by the programmer to the source code snippet and with one or more of the candidate source code transformations.

In some implementations, the source code editor application in which the source code transformation is captured may be part of an integrated development environment (IDE) 111 operated by a respective client 110. In other implementations, the source code editor application may be a standalone application, such as a simple text editor, a word processing application, a source code editor application with specific functionality to aid in computer programming. Whether the programmer uses a standalone source code editor application or a source code editor module of an IDE 111, in many cases, the source code the programmer sees may be visually annotated, e.g., with different tokens being rendered in different colors to facilitate ease of reading. In some implementations, the source code editor may include extra functionality specifically designed to ease programming tasks, such as tools for automating various programming tasks, a compiler, real time syntax checking, etc. In some implementations, techniques described herein may enhance aspects of this extra functionality provided by a source code editor (whether a standalone application or part of an IDE), e.g., by generating and/or recommending new tools for automating various programming tasks, for making code edit suggestions (e.g., to comport with prior successful transformations), and so forth.

In various implementations, code knowledge system 102 may include a machine learning ("ML" in FIG. 1) module 105 that has access to data indicative of one or more trained machine learning models (not depicted). These trained machine learning models may take various forms, including but not limited to a graph-based network such as a graph neural network (GNN), graph attention neural network (GANN), or graph convolutional neural network (GCN), a sequence-to-sequence model such as an encoder-decoder, various flavors of a recurrent neural network ("RNN", e.g., long short-term memory, or "LSTM", gate recurrent units, or "GRU", etc.), and any other type of machine learning model that may be applied to facilitate selected aspects of the present disclosure.

ML module 105 may apply these machine learning models to various data in order to identify and/or select candidate transformations made previously, e.g., by other programmers to the same code base or to different code base(s). For example, in various implementations, ML module 105 may apply a machine learning model such as a GNN or an encoder portion of an autoencoder to data indicative of a transformation made by a programmer to a source code snippet to generate an embedding (or feature vector) representation. When a graph-based machine learning model such as a GNN is applied, the source code transformation may be represented in the form of a graph, such as an abstract syntax tree (AST).

In some implementations, data indicative of the intent behind the transformation and/or data indicative of the content in which the transformation was made may also be applied as additional inputs to the machine learning model, although this is not required. One or more nearest neighbor embeddings in embedding space(s) that correspond to one or more source code transformation repositories $108_{1-N}$ may be identified, e.g., using techniques such as the dot product or cosine similarity. These identified embeddings, and the underlying prior source code transformations they represent, may be analyzed as candidate source code transformations for potential use to generate and/or recommend tool(s) for automating programming tasks.

In some implementations, candidate source code transformations may be analyzed, e.g., by transformation module 104, against various criteria to determine which, if any, qualify as a basis for generating and/or recommending a tool to automate programming task(s). These criteria may take various forms, such as a threshold similarity between the present source code transformation made by the programmer and the candidate source code transformation under consideration. This measure of similarity may be determined in various ways, such as via an edit distance (e.g., character-to-character, token-to-token, etc.), or via a distance between the corresponding embeddings in the embedding space. In the latter case, in some implementations, a threshold distance may be established. If the embeddings are farther apart in embedding space than this threshold distance, the source code transformations underlying the embeddings may not be sufficiently similar to warrant generation/recommendation of a tool configured with selected aspects of the present disclosure.

Figure 2:
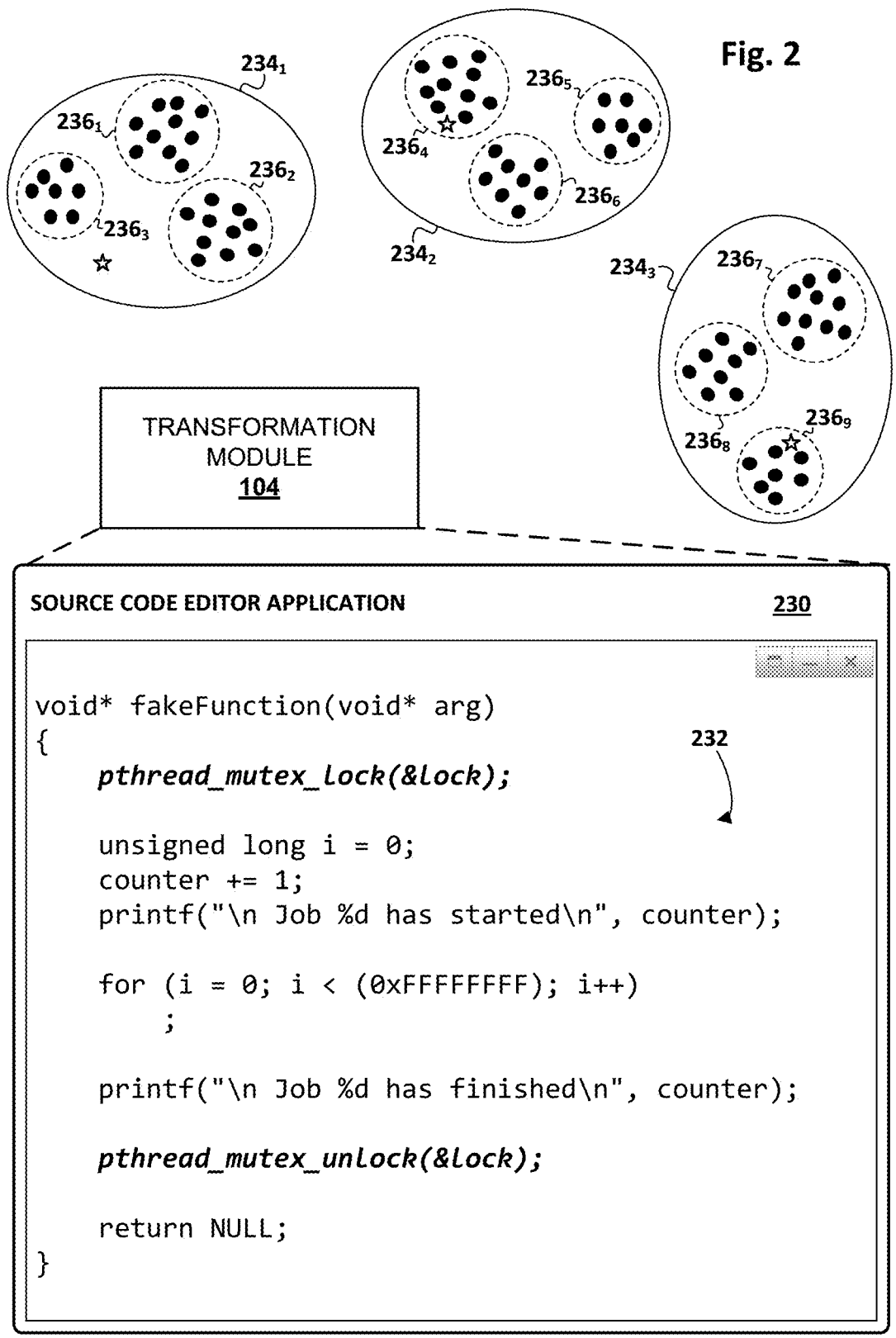
FIG. 2 schematically demonstrates an example of how aspects of the present disclosure may be implemented, in accordance with various implementations.

FIG. 2 schematically demonstrates an example of how aspects of the present disclosure may be implemented, in accordance with various implementations. A source code editor application 230, which may or may not be part of a larger IDE 111, is being operated by a programmer (not depicted) to edit a source code snippet 232. In this example, source code snippet 232 is a function called "fakeFunction." The programmer has added code, is shown in bold and italics, that incorporates a mutex lock into the function, e.g., because the function is to be used as part of a multi-thread software application.

In various implementations, transformation module 104 may capture the changes the programmer made to source code snippet 232, e.g., as they are made and/or soon after they are made. In some implementations, transformation module 104 may generate, e.g., using a machine learning model such as an encoder portion of an autoencoder, a GNN, etc., an embedding that represents the transformation made by the programmer to source code snippet 232. In some implementations, this embedding may then be mapped to a plurality of embedding spaces $234_{1-3}$ as indicated by the white star in each embedding space 234 in FIG. 2. In various implementations, each embedding space 234 may correspond to a distinct repository of transformations ($108_{1-N}$ in FIG. 1). While three embedding spaces $234_{1-3}$ corresponding to three transformation repositories are depicted in FIG. 2, other numbers of embeddings spaces that, for instance, correspond to other numbers of transformation repositories, are contemplated.

In some implementations, in addition to source code snippet 232, other data may be provided as inputs for application of the machine learning model. For example, an intent behind the current transformation made by the programmer may be determined, e.g., based on a comment (not depicted) incorporated by the programmer into the source code and/or based on a commit comment provided by the programmer when committing the source code to a VCS. Additionally or alternatively, a context in which the current transformation is being made may also be determined. One or both of these data points may be provided as inputs to the machine learning model. Alternatively, the context in which the current transformation is being made may be used to select and/or exclude one or more embedding spaces 234 (e.g., corresponding to one or more transformation repositories 108) from consideration.

In FIG. 2, a plurality of clusters $236_{1-9}$ of prior source code transformation embeddings (each transformation embedding represented by a black dot) are depicted across the three embedding spaces $234_{1-3}$. The distributions of transformation embeddings depicted in FIG. 2 are for illustrative purposes only and are not meant to be limiting. In the first embedding space $234_1$, the white star representing the embedding of the current transformation made by the programmer is outside of all three clusters $236_{1-3}$ of prior source code transformation embeddings. Thus, it can be concluded that the current source code transformation made by the programmer is not particularly similar to prior source code transformations made by others that are represented by embeddings 236 in first embedding space $234_1$.

By contrast, in second embedding space $234_2$, the white star representing the embedding of the current transformation made by the programmer is much closer to a cluster of prior source code transformation embeddings $236_4$. Similarly, in third embedding space $234_3$, the white star representing the embedding of the current transformation made by the programmer is much closer to a cluster of prior source code transformation embeddings $236_9$. Thus, prior source code transformations represented by the embeddings of clusters $236_4$ and $236_9$ may be suitable for consideration as candidate source code transformations to which the present source code transformation may be compared and used to generate and/or recommend a tool for automating programming task(s) associated with these transformations.

In some implementations, one or more candidate prior source code transformations may be identified/filtered/ranked as potential bases for tools for automating programming task(s) based on various criteria. For example, prior source code transformations represented by the embeddings of cluster $236_4$ may be promoted because the context in which the current transformation is being made corresponds to and/or is semantically similar to a context associated with second embedding space $234_2$ (and hence, a transformation repository) that includes cluster $236_4$.

For instance, second embedding space $234_2$ may include transformations made to source code designed for a particular domain (e.g., banking, travel reservations, e-commerce) or for a particular technology area (e.g., code to generate dynamic websites), and the current transformation may fall under a similar context. If a context associated with third embedding space $234_3$ (and hence, cluster $236_9$) is less pertinent to the context in which the present transformation is being made than the context associated with second embedding space $234_2$, then prior source code transformation(s) from second embedding space $234_2$ may be ranked higher than prior source code transformation(s) from third embedding space $234_3$.

The embedding spaces $234_{1-3}$ and transformation repositories (108) underlying them may, in some cases, be in constant flux. Suppose second embedding space $234_2$ is associated with prior source code transformations to source code for operating interactive websites. Suppose further that those resultant websites undergo constant/periodic performance evaluations (e.g., for latency, security, privacy protection, usability, etc.) that are used to assign measures of success (or failure) to prior source code transformations made to the underlying source code. In such a case, new transformations may be added to second embedding space $234_2$ on an ongoing basis. It follows, then, that as each new programmer makes changes to contextually-similar source code, transformations that have been newly-added to prior source code repositories will be available as candidates to generate/recommend tools for automating programming task(s). This may improve both the programmer's efficiency (e.g., by creating new tools for automating programming task(s)) and the quality of the programmer's work (e.g., by generating tools that automate programming task(s) used recently to improve source code elsewhere).

Figure 3:
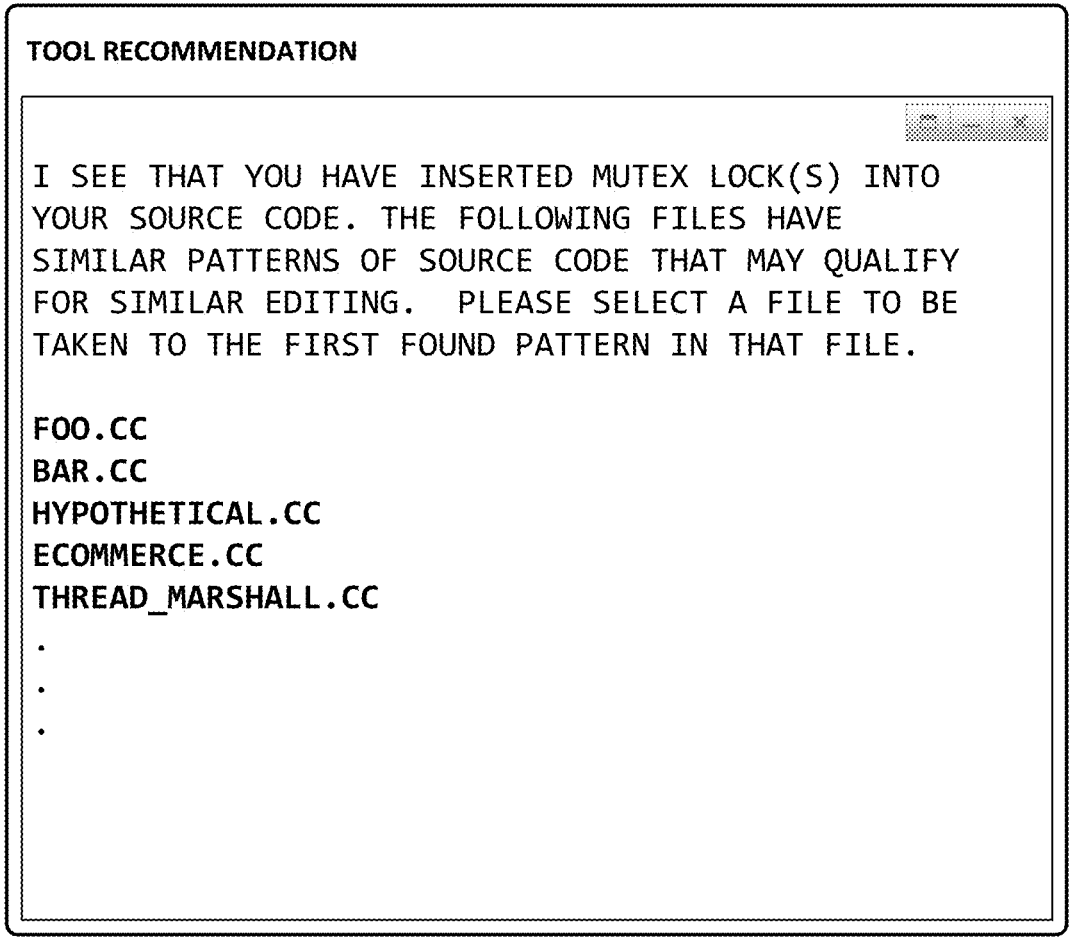
FIG. 3 depicts an example graphical user interface (GUI) that may be presented in accordance with various implementations described herein.

FIG. 3 depicts an example GUI that may be presented to a user to recommend one or more tools for automating programming tasks(s), and for facilitating navigation to relevant portions of source code for potential transformation. In this example, it may be assumed that the programmer has inserted one or more mutex lock statements into source code. These transformation(s) may be captured and used as described above to identify candidate prior source code transformations that can then be used to generate/recommend tools for automating programming task(s).

In FIG. 3, a tool (e.g., a macro) has been generated and the programmer is being informed that other source code snippets in other source code files may be suitable for manipulation by the tool to perform similar transformations. The programmer may, for instance, click on any of the presented file names (foo.cc, bar.cc, hypothetical.cc, etc.) to cause the corresponding source code file to be opened, and in some cases, the relevant source code snippet(s) to be highlighted and/or otherwise brought to the user's attention. In some implementations, the user may toggle through a plurality of source code snippets across one or more source code files to find each instance of source code that appears suitable for a similar transformation (e.g., similar to a "find text" function in a word processing application). At each found instance of potentially suitable source code, in some implementations, the programmer may provide input (e.g., press a "yes" or "no" button) to either accept or reject the transformation being automatically applied. Alternatively, the programmer may have the option at each found instance to modify the proposed transformation before accepting it.

In some implementations, a user may manually designate a source code snippet and request suggestions for automating programming task(s) on the designated source code snippet. As an example of this, FIG. 4 depicts an alternative GUI that may be presented, e.g., as a pop-up window, in conjunction with source code editor application 230. In this example, the same source code snippet 232 depicted in FIG. 2 is presented prior to the transformation (adding mutex) that was applied in FIG. 2. Moreover, and as indicated by the shading, the text of this fakeFunction has been designated by the programmer by the programming selecting the source code snippet. This manual selection of source code snippet 232 may, in some implementations, trigger transformation module 104 to perform selected aspects of the present disclosure to generate and/or recommend tool(s) to automate programming tasks that may be performable on the selected source code. Examples of such tools are shown in the pop-up window at bottom right of FIG. 4.

Implementations described herein are not limited to generating tools for automating programming tasks on the fly. In some implementations, these tools may exist already. For example, an existing tool may be identified based on a measure of similarity between a current transformation (or selected source code as mentioned in relation to FIG. 4) and one or more prior source code transformations that were partially or wholly automated with the tool. If the current transformation and one or more of the prior transformations are sufficiently similar (e.g., in terms of syntax, context, and/or underlying intent), then the existing tool may be recommended for use by the programmer.

Figure 5:
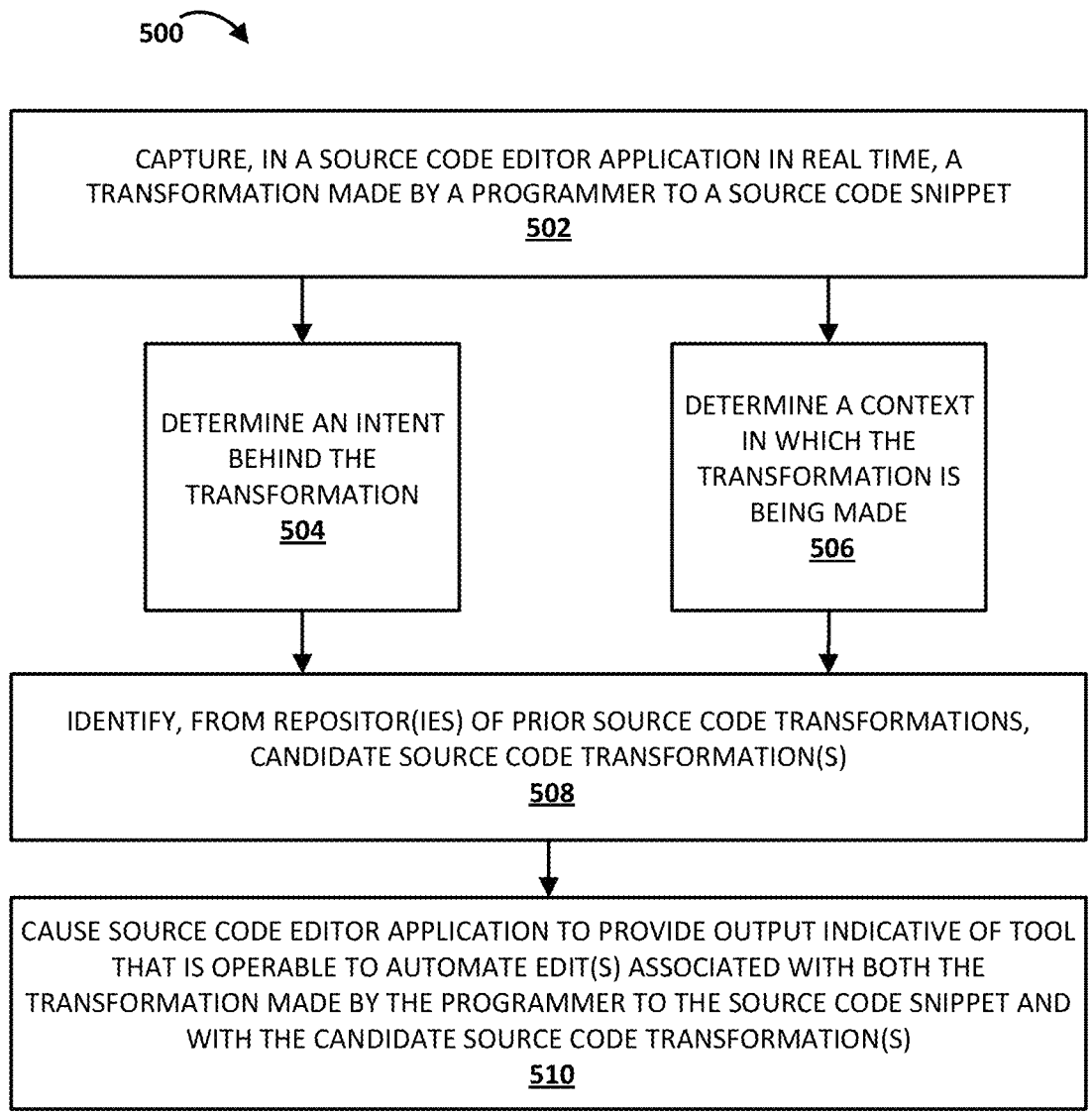
FIG. 5 depicts a flowchart illustrating an example method for practicing selected aspects of the present disclosure.

FIG. 5 is a flowchart illustrating an example method 500 of practicing selected aspects of the present disclosure, in accordance with implementations disclosed herein. For convenience, the operations of the flow chart are described with reference to a system that performs the operations. This system may include various components of various computer systems, such as one or more components of code knowledge system 102. Moreover, while operations of method 500 are shown in a particular order, this is not meant to be limiting. One or more operations may be reordered, omitted or added.

At block 502, the system may capture, in a source code editor application (e.g., of IDE 111) in real time, a transformation made by a programmer to a source code snippet. As noted previously, a transformation may be captured and/or represented in various ways, such a sequence of edits, a bag of edits, a change graph, pairs of source code snippets (one before the transformation, one after), etc. In some implementations, before and after versions of the source code snippet may be used to generate before and after ASTs. In some such implementations, a change graph AST may be generated based on these before and after ASTs.

At block 504, the system may determine an intent behind the transformation. The intent behind the transformation may be determined by the system in various ways. In some implementations, the system may semantically process, e.g., using various natural language processing techniques, a natural language comment contained in a source code file that also includes the source code snippet (e.g., in close proximity to the snippet). Additionally or alternatively, in some implementations, the system may semantically process other text, such as one or more tokens of the source code snippet, or text of a commit comment made when the source code is committed (or was last committed) to a VCS. In some implementations, block 504 may be omitted.

At block 506, which may occur in parallel with the operation(s) of block 504 as shown in FIG. 5 or may occur in series therewith, the system may determine a context in which the transformation is being made. This context may take various forms and may be determined in various ways. In some implementations, the context includes a function or purpose of an executable application that results from compilation of the source code snippet. For instance, one purpose of a software application could be "generation of markup language to operate an interactive website." Another purpose of a software application could be "managing flight bookings and itineraries." And in some implementations, context may include a domain of a software application, such as "banking," "airlines," "entertainment," "security," etc.

In some implementations, the system may determine the context based on one or more other transformations made by the programmer to other source code snippets prior to the transformation. For example, if the programmer inserts a number of mutex statements and other code related to multi-threading, then a context of "converting source code to multi-thread-capable" or similar may be determined. In some implementations, the context in which a transformation is made and the intent behind it may overlap or even be identical (e.g., "porting code base to new API"). In other implementations, block 506 may be omitted.

Based on the transformation, as well as on the intent determined at block 504 and the context determined at block 506, at block 508, the system may identify, from one or more repositories of prior source code transformations made by one or more other programmers, one or more candidate source code transformations. In some implementations, the system may select one or more of the repositories of prior source code transformations based on the context, and then may select transformations within those selected repositories based on the intent determined at block 504 and the transformation itself. In other implementations, data indicative of the intent and/or context may be provided, along with data indicative of the transformation captured at block 502, as inputs to a machine learning model (e.g., an encoder, a GNN, etc.) to generate an embedding that encodes, along with the syntax of the source code transformation, one or both of the intent and context. In some implementations, application of data indicative of the transformation as input across a machine learning model may generate output in the form of an embedding. In some such implementations, one or more nearest neighbors to the embedding in an embedding space indexed by embeddings of prior source code transformations of one or more of the repositories may be identified.

At block 510, the system may cause the source code editor application to provide output indicative of a tool that is operable to automate one or more edits associated with both the transformation made by the programmer to the source code snippet and with one or more of the candidate source code transformations. Non-limiting examples of such outputs were depicted in FIGS. 3-4. Other examples may include, for instance, addition of a button in a ribbon of a GUI of the source code editor that is operable by the programmer to trigger the tool, e.g., by jumping to the next snippet of source code that matches a pattern associated with (e.g., searched for) the tool.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method of FIG. 5, as well as to implement various components depicted in FIGS. 1-2.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
    capturing, in a source code editor application in real time, a transformation made by a programmer to a source code snippet;
    determining an intent behind the transformation, wherein determining the intent includes:
    applying data indicative of the transformation as input across a machine learning model to generate an embedding,
    identifying one or more nearest neighbors to the embedding in an embedding space indexed by reference intents behind prior source code transformations, and
    determining the intent based one or more reference intents behind the one or more nearest neighbors;
    based on the transformation and the intent, selecting, from a plurality of transformation repositories, one or more candidate source code transformations;
    causing the source code editor application to provide output indicative of a tool that is operable to automate one or more edits associated with both the transformation made by the programmer to the source code snippet and with one or more of the candidate source code transformations; and
    automating one or more of the edits associated with both the transformation made by the programmer to the source code snippet and with one or more of the candidate source code transformations based on the output.

2. The method of claim 1, wherein the one or more candidate source code transformations comprise a plurality of candidate source code transformations.

3. The method of claim 2, wherein the tool comprises a graphical user interface (GUI) that includes a list of source code files containing the plurality of candidate source code transformations.

4. The method of claim 3, wherein each source code file in the list is selectable to navigate to the source code file.

5. The method of claim 1, wherein determining the intent behind the transformation further comprises semantically processing a natural language comment contained in a source code file that also includes the source code snippet.

6. The method of claim 1, wherein determining the intent behind the transformation further comprises semantically processing one or more tokens of the source code snippet.

7. The method of claim 1, further comprising determining a context in which the transformation is being made, wherein the selecting is further based on the context.

8. The method of claim 7, wherein the context is determined based on one or more other transformations the programmer made to other source code snippets prior to the programmer making the transformation to the source code snippet.

9. The method of claim 7, wherein the context in which the transformation is being made by the programmer includes a function of an executable application that results from compilation of the source code snippet.

10. A system comprising one or more processors and memory storing instructions that, in response to execution by the one or more processors, cause the one or more processors to:
   capture, in a source code editor application in real time, a transformation made by a programmer to a source code snippet;
   determine an intent behind the transformation, wherein the instructions to determine the intent include instructions to:
   apply data indicative of the transformation as input across a machine learning model to generate an embedding,
   identify one or more nearest neighbors to the embedding in an embedding space indexed by reference intents behind prior source code transformations, and
   determine the intent based one or more reference intents behind the one or more nearest neighbors;
   based on the transformation and the intent, select, from a plurality of transformation repositories, one or more candidate source code transformations;
   cause the source code editor application to provide output indicative of a tool that is operable to automate one or more edits associated with both the transformation made by the programmer to the source code snippet and with one or more of the candidate source code transformations; and
   automate one or more of the edits associated with both the transformation made by the programmer to the source code snippet and with one or more of the candidate source code transformations based on the output.

11. The system of claim 10, wherein the one or more candidate source code transformations comprise a plurality of candidate source code transformations.

12. The system of claim 11, wherein the tool comprises a graphical user interface (GUI) that includes a list of source code files containing the plurality of candidate source code transformations.

13. The system of claim 12, wherein each source code file in the list is selectable to navigate to the source code file.

14. The system of claim 10, comprising instructions to semantically process a natural language comment contained in a source code file that also includes the source code snippet.

15. The system of claim 10, wherein the instructions to determine the intent behind the transformation comprise instructions to semantically process one or more tokens of the source code snippet.

16. The system of claim 10, further comprising instructions to determine a context in which the transformation is being made, wherein the selecting is further based on the context.

17. The system of claim 16, wherein the context is determined based on one or more other transformations the programmer made to other source code snippets prior to the programmer making the transformation to the source code snippet.

18. The system of claim 16, wherein the context in which the transformation is being made by the programmer includes a function of an executable application that results from compilation of the source code snippet.

19. At least one non-transitory computer-readable medium comprising instructions that, when executed by one or more processors, cause the one or more processors to:
   capture, in a source code editor application in real time, a transformation made by a programmer to a source code snippet;
   determine an intent behind the transformation, wherein determining the intent includes:
   apply data indicative of the transformation as input across a machine learning model to generate an embedding,
   identify one or more nearest neighbors to the embedding in an embedding space indexed by reference intents behind prior source code transformations, and
   determine the intent based one or more reference intents behind the one or more nearest neighbors;
   based on the transformation and the intent, select, from a plurality of transformation repositories, one or more candidate source code transformations;
   cause the source code editor application to provide output indicative of a tool that is operable to automate one or more edits associated with both the transformation made by the programmer to the source code snippet and with one or more of the candidate source code transformations; and
   automate one or more of the edits associated with both the transformation made by the programmer to the source code snippet and with one or more of the candidate source code transformations based on the output.

20. The at least one non-transitory computer-readable medium of claim 19, wherein the one or more candidate source code transformations comprise a plurality of candidate source code transformations.

* * * * *